No. 831,818. PATENTED SEPT. 25, 1906.
H. P. BALL.
DEVICE FOR PERFORATING MUSIC STRIPS.
APPLICATION FILED JAN. 19, 1903.

WITNESSES:
J. E. Pearson
Frank O'Connor

INVENTOR
H. P. Ball
BY
Geo. H. Benjamin
ATTORNEY

No. 831,818. PATENTED SEPT. 25, 1906.
H. P. BALL.
DEVICE FOR PERFORATING MUSIC STRIPS.
APPLICATION FILED JAN. 19, 1903.

WITNESSES:
J. E. Pearson
Mark O'Connor

INVENTOR
H. P. Ball
BY
ATTORNEY

No. 831,818. PATENTED SEPT. 25, 1906.
H. P. BALL.
DEVICE FOR PERFORATING MUSIC STRIPS.
APPLICATION FILED JAN. 19, 1903.

WITNESSES:

INVENTOR
H. P. Ball
BY
Geo. H. Benjamin
ATTORNEY

No. 831,818. PATENTED SEPT. 25, 1906.
H. P. BALL.
DEVICE FOR PERFORATING MUSIC STRIPS.
APPLICATION FILED JAN. 19, 1903.

WITNESSES:
J. E. Pearson
Max O'Connor

INVENTOR
H. P. Ball
BY
ATTORNEY

No. 831,818. PATENTED SEPT. 25, 1906.
H. P. BALL.
DEVICE FOR PERFORATING MUSIC STRIPS.
APPLICATION FILED JAN. 19, 1903.

WITNESSES:
J. E. Pearson
Frank O'Connor

INVENTOR
H. P. Ball
BY
ATTORNEY

UNITED STATES PATENT OFFICE.

HENRY PRICE BALL, OF NEW YORK, N. Y., ASSIGNOR OF ONE-HALF TO SAMUEL INSULL, OF CHICAGO, ILLINOIS.

DEVICE FOR PERFORATING MUSIC-STRIPS.

No. 831,818.　　　Specification of Letters Patent.　　　Patented Sept. 25, 1906.

Application filed January 19, 1903. Serial No. 139,607.

*To all whom it may concern:*

Be it known that I, HENRY PRICE BALL, a citizen of the United States, residing at New York city, county and State of New York, have invented a Device for Recording and Repeating Musical Compositions, of which the following is a specification.

My invention relates to a device for recording a musical composition as a series of holes in a music-strip and subsequently employing said strip for testing purposes or otherwise and in the same instrument to reproduce the note or notes so recorded.

The object of my invention, broadly stated, consists of a device adapted to be used in connection with a sound-producing instrument, such as a piano or organ, and a mechanical reproducing instrument, such as a pianola or angelus, by means of which a performer upon such sound-producing instrument of no exceptional ability may cause to be recorded upon a moving music-strip, as a series of holes of the required length, the notes of a musical composition, number of notes played, &c., far beyond the physical ability of the performer to produce upon the sound-producing instrument for which the musical composition is written; further, in the provision of means whereby notes of the same time value which are to be repeated in the reproduction of the composition as a trill will be recorded in the music-strip as a series of holes of the same length definitely spaced and irrespective of the length of the trill without requiring the performer to strike each repeated note; further, in the provision of means whereby holes indicative of a trill may have their length initially determined and varied at the will of the performer; further, in the provision of means whereby the whole of the musical composition or any portion or note of the musical composition may be played or sounded for testing purposes or otherwise; further, in the provision of means whereby the note-name of any hole formed in the music-sheet will be visibly indicated; further, in the provision of means whereby measures of musical length are both visibly and audibly indicated.

Speaking more generally, my invention consists of a device through the instrumentality of which a player of ordinary ability upon a piano or organ may record a composition which can only be played by a great artist or by the use of four hands—a device by which an unskilled performer may successively build a record of a musical composition—as, for instance, he may first introduce the theme-notes, then the bass notes, then the trills, changing, if required, the length of the individual notes of successive trills, at times stopping the device, and reversing the movement of the music-strip through the device to test the notes recorded and, if desired, to rearrange their position or cause the machine to automatically introduce the trills without any act on the part of the performer, with the exception of the initial movement or movements required to start the trill or trills.

The above statement will be sufficient to convey a general idea of my invention, and in the following specification I shall endeavor to specifically set forth the particular features of invention which I consider new and novel.

The accompanying drawings will serve to illustrate my invention.

Similar characters indicate like parts

Figure 8:
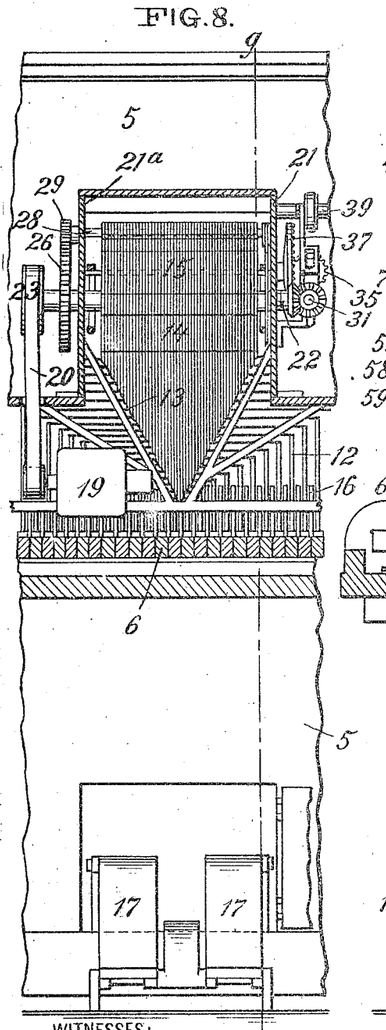
Fig. 8 is a front view and vertical section on the line $f\ f$ of Fig. 9, showing my improved perforating device mounted over the keyboard of an instrument involving the mechanism of a piano and a mechanical musical instrument of the general character of the pianola or angelus.
Figure 9:
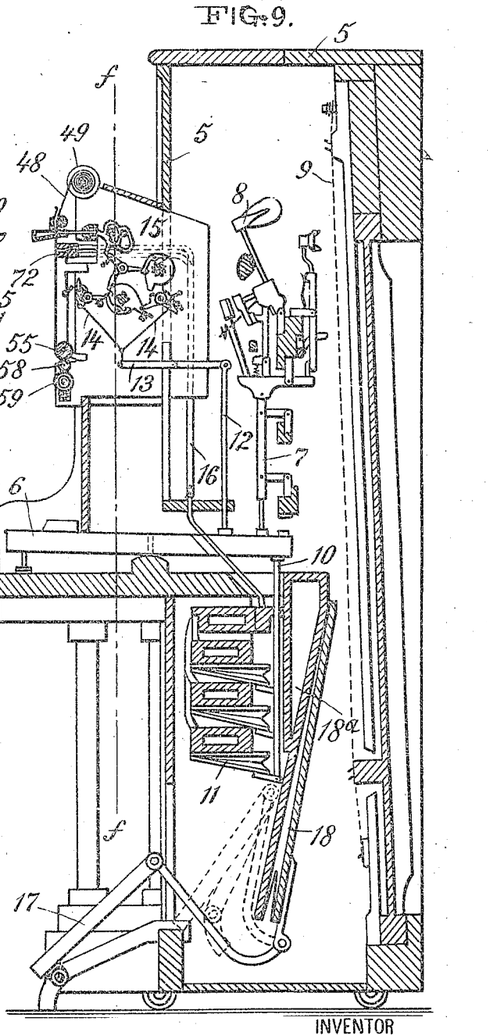
Fig. 9 is a longitudinal section approximately on the line $g\ g$ of Fig. 8.

Referring first to Figs. 8 and 9, 5 indicates the inclosing frame of an instrument involving the mechanism of a piano, of a mechanical musical instrument, and of a perforating device, and which consists generally of a keyboard 6, connected, as is usual, through rods 7, with the striking-hammers 8, adapted to impinge, when moved, upon the strings 9 of the instrument. The keyboard 6 is also shown as connected through rods 10 to pneumatics 11, as is usual in mechanical musical instruments, and, further, through rods 12 and levers 13 to cords 14, which actuate the mechanism of the perforating device 15. The perforating device 15 is shown as situated in the front of the instrument and connected with the pneumatics 11 through the pipes 16. I wish it understood that I do not limit myself in any wise to the position which the perforating device may bear relative to the instrument upon which the musical composition is played or reproduced, as it is not essential that it should be placed in close contact with the instrument. It may be at a distance and connected through electrical, mechanical, or pneumatic apparatus, as desired and found convenient. 17 indicates foot-treadles for operating the bellows 18, which serve to exhaust the air through the wind-chest 18$^a$ from the pneumatics 11; 19, electro or other form of motor for driving the perforating-machine 15 through the belt 20.

Referring now to the other figures, the perforating device consists generally of the side frames 21 21$^a$, secured together in any suitable manner and provided with flanges 21$^b$ at the bottom, through which the machine may be secured in any suitable location. Arranged transversely of the side frames is the main driving-shaft 22. On one end of this shaft is a driving-pulley 23, over which passes the belt 20 from the motor 19. The motor 19 derives its current from the dynamo 24, and the speed of the motor may be regulated through the rheostat 25. Located on the same end of the shaft 22 is a gear-wheel 26 and on the opposite end of the shaft a beveled gear 27. Arranged also transversely of the side plates 21 21$^a$ is the shaft 28, which drives the punches, as will be described. On one end of this shaft and in mesh with the gear 26 is a small gear 29. The relation of the gear 26 to the gear 29 is such that the gear 29 will make four revolutions to one of the gear 26. I do not limit myself to the above ratio, as any difference in speed may be employed which is found desirable.

Projecting from the side frame 21 is a bracket 30, (best shown in Fig. 2,) and arranged in bearings in the lower portion of this bracket is a shaft 31, on the forward end of which is a beveled gear 32, in mesh with the beveled gear 27 on shaft 22. The shaft 31 is therefore driven at the same speed as shaft 22. Arranged upon the shaft 31 are the gears $h\ h'\ h^2\ h^3\ h^4\ h^5$ of decreasing diameter, collectively forming a cone of gears.

Mounted in bearings 33 33$^a$ at about the center of the bracket 30 is a square shaft 34, on which is secured a channeled hub 35, carrying in such channel an annular gear-wheel 35$^a$, free to turn and adapted to be brought into mesh, through a longitudinal movement of the shaft 34, with any one of the cone of gears $h$ to $h^5$ and also with any one of the concentric rows of gear-teeth $i\ i'\ i^2\ i^3\ i^4\ i^5$ on the outer face of the disk-wheel 37, located on the end of shaft 38 and external to the side plate 21. To move the shaft 34 to bring the gear 35$^a$ into relation with the gears $h\ i$ and corresponding gears, as the case may be, I provide the handle 36. This handle is mounted upon a sleeve 39 on shaft 40, secured to the upper portion of the side plate 21 of the machine. Mounted also upon the sleeve 39 is an arm 41, connected to the shaft 34 through the pin 42, located in the slot 43 of the arm 41. In order to hold the handle 36 in any position in which it may be placed, I arrange upon the shaft 40 a band-wheel 44, over which is arranged an adjustable band 45. Connected to the inner end of the sleeve 39 is a second arm 46, which projects through an arc-shaped scale 47, attached to the side plate 21, and which arm serves by its position on the scale to indicate to the operator, seated in front of the machine, the position of the gear 35$^a$ relative to the gears $h\ i$, or, otherwise, the speed at which the disk 37 and shaft 38 is or is to be driven.

It will be observed that as the shafts 22 and 31 have the same speed the shaft 38 will be driven at a speed dependent upon the position of the gear 35$^a$ relative to the gears $h\ i$—that is, assuming the parts to be in the position shown in the drawings, the speed of the disk 37 will be maximum, and with the gear 35$^a$ in mesh with the gears $h^5\ i^5$ the speed of the disk will be minimum. The purpose of this arrangement is, as will hereinafter be fully described, to provide means for determining the length which shall be given to the perforation for any note or series of notes where such notes are to be frequently repeated—as, for example, indicating a trill.

When the instrument is used to automatically record the successive movements of a performer without giving definite length to any series of notes other than the length provided for by the general mechanism of the device, the parts under the control of the cone of gears on shaft 31 and disk 37 may be considered to be out of action, as they exert no modifying effect, as will be explained. Before describing the action of such modifying mechanism I will describe the mechanism for moving the strip to be perforated and the punching mechanism.

Figures 4, 10:
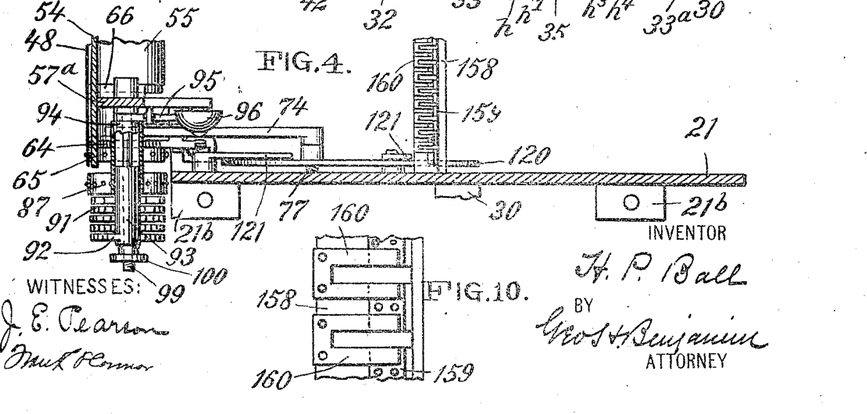
Fig. 4 is a part section and plan taken on the line $b\ b$ of Fig. 2.
Fig. 10 is an enlarged view of a portion of the device used for establishing circuit connections in the machine.

The strip 48 to be perforated is wound upon the cylinder 49, secured on shaft 50, which is supported in suitable bearings 51, projecting forwardly from the side frames 21 21ᵃ of the machine. The bearings 51 are made in two parts, so as to allow the shaft 50 and cylinder from which the strip is wound to be removed from the bearings, and such parts are secured together by means of thumb-screws 52. On the ends of the shaft 50 are the hand-wheels 53, by means of which the paper may be rewound upon the cylinder 49 when it is desired to move the music-strip upward in the machine. The music-strip may be formed of paper or any other material suitable for the purpose. The music-strip is carried downward over the front plate 54 of the machine and over the front of a cylinder 55, fastened on shaft 56, which has its bearings 57 in plates 57ᵃ, Fig. 4, arranged parallel with and secured to the side frames 21 21ᵃ. The music-strip is then turned backward and downward over the surface of a cylinder 58, having its bearings in the side frames 21 21ᵃ, then brought forward and wound upon the cylinder 59 on shaft 60, mounted in elastically-supported bearings 61, Fig. 5, located in slots 62 in the side frames 21 21ᵃ. Situated under the bearings 61 are the helical springs 63. The cylinder 59 is adapted to be removable, and the object of mounting it in elastically-supported bearings is to compensate for the increased size of the roll, as the music-strip is wound upon it.

The shaft 56, it will be observed, is extended beyond its right-hand bearing. Secured to this shaft beyond the bearing is a ratchet-wheel 64 and at its opposite ends rack-wheels 65. Connected to the plates 57ᵃ at opposite ends of the cylinder 55 are semicircular metal plates 66, which follow the curvature of cylinder 55, but do not revolve with the cylinder. These plates serve to guide the music-strip as it passes over the cylinder 55 and between the cylinders 55 and 58. Pins on the rack-wheels 65 are adapted to coact with recesses in the ends of the cylinder 58 and also with rack-holes arranged along the outer edges of the music-strip 48 to impart to the music-strip when the cylinder 59 is rotated in one direction a downward movement and when the cylinder 49 is rotated in the other direction an upward movement. The manner in which these rack-holes are made will be hereinafter described.

Situated at the front of the machine and over the music-strip is an indicating-plate 68, which in the present case is shown as marked to indicate the keys of a piano or other similar instrument. This plate has for its purpose to visibly indicate to the operator of the piano the name of the note perforated in the music-strip—as, for instance, as indicated in the lower portion as E G, C E G, C E, G C, G C, progressively along the sheet from left to right, or, in other words, the notes vertically in line with the representation of a key on the indicating-scale give the name of such key.

Situated across the top of the machine and immediately below the indicating-plate 68 is a perforated plate 69, within which are located the punches 70. (Best shown in Figs. 2, 5, and 7.) The number of punches will correspond to the number of keys of the musical instrument employed, there being usually sixty-five keys. Situated in front of the perforated plate 69 and over the music-strip 48 is a perforated die-plate 71, whose perforations correspond in number and position with the perforations in the plate 69. Situated under the punch-plate is a tracker-board 72, the perforations in the surface of which are connected through pipes 16 (see Fig. 9) with the pneumatics 11 of the mechanical musical instrument, as shown in Fig. 9.

I wish it understood that I do not in any wise limit myself to the character of the tracker-board, its connections to the pneumatic or sounding device of the mechanical musical instrument, or the character of the mechanical musical instrument employed, as many variations may be made. For instance, the tracker-board may have duplicate sets of ducts, one set communicating with the ordinary pneumatics of a mechanical musical instrument and the other set to a series of pneumatics adapted to accentuate notes. The purpose of the tracker-board and the mechanical musical instrument is to permit the operator to test any note perforated in the music-strip 48. This can be done as the music-strip moves downward over the tracker-board, or through the instrumentality of the handles 53 on the shaft 50 the music-strip may be moved backward to test any note previously formed and which has passed the tracker-board.

Of course in the ordinary operation of the device there will exist no differentiation of air-pressure in the mechanical musical instrument, and the notes will not sound as they pass the tracker-board unless such differentiation is created by the act of the performer in moving the pedals 17 of the mechanical musical instrument.

Figure 5:
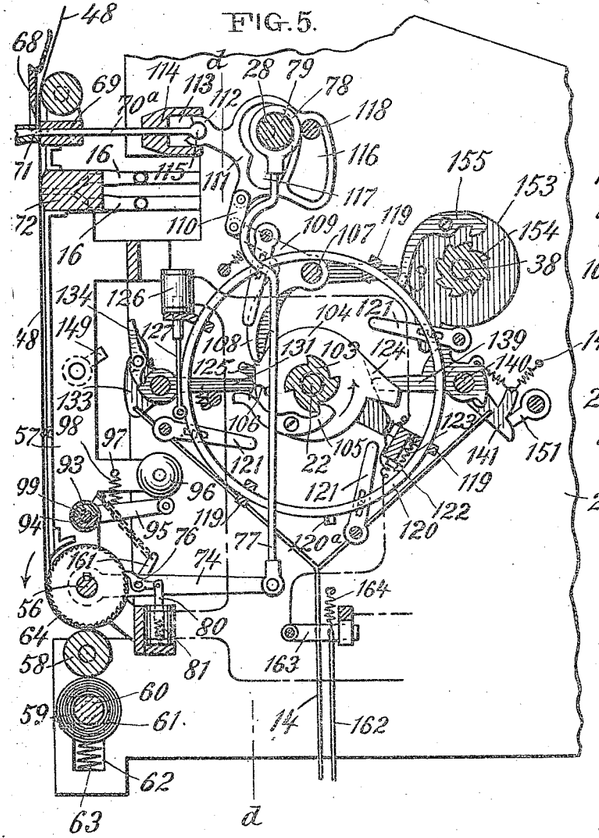
Fig. 5 is a vertical section and elevation taken on the line $c\ c$ of Fig. 3.

The movement of the cylinder 55 and the movement of the music-strip over the rack-wheels 65 in a downward direction are effected through the action of a lever 74, Fig. 5. This lever is loosely pivoted upon shaft 56 at the left of the ratchet-wheel 64. Mounted on the right-hand side of this lever is a pawl 76, which engages with the teeth of the ratchet-wheel 64. Pivotally connected to the rear end of the lever 74 is a rod 77. The upper end of this rod is formed as a strap 78 and is carried over an eccentric 79 on shaft 28. It will be understood that when the shaft 28 is rotated the lever 74 will be reciprocated and the pawl 76, taking in the teeth of the ratchet-wheel 64, will impart to such ratchet-wheel 64 and cylinder 55 a movement in the direction indicated by the arrow, Fig. 5, thereby moving the music-strip 48 progressively downward. In designing these parts they are so proportioned that the music-strip will be moved downward one-twentieth of an inch for each complete reciprocation of the shaft 28.

In order to control the downward movement of the music-strip under certain contingencies, to be hereinafter described, I connect to the rear end of the pawl 76 the core 80 of a solenoid 81. It will be understood that when a current is sent through the solenoid 81 the pawl 76 will be disengaged from the ratchet-wheel 64 and the downward movement of the music-strip will cease.

Figure 1:
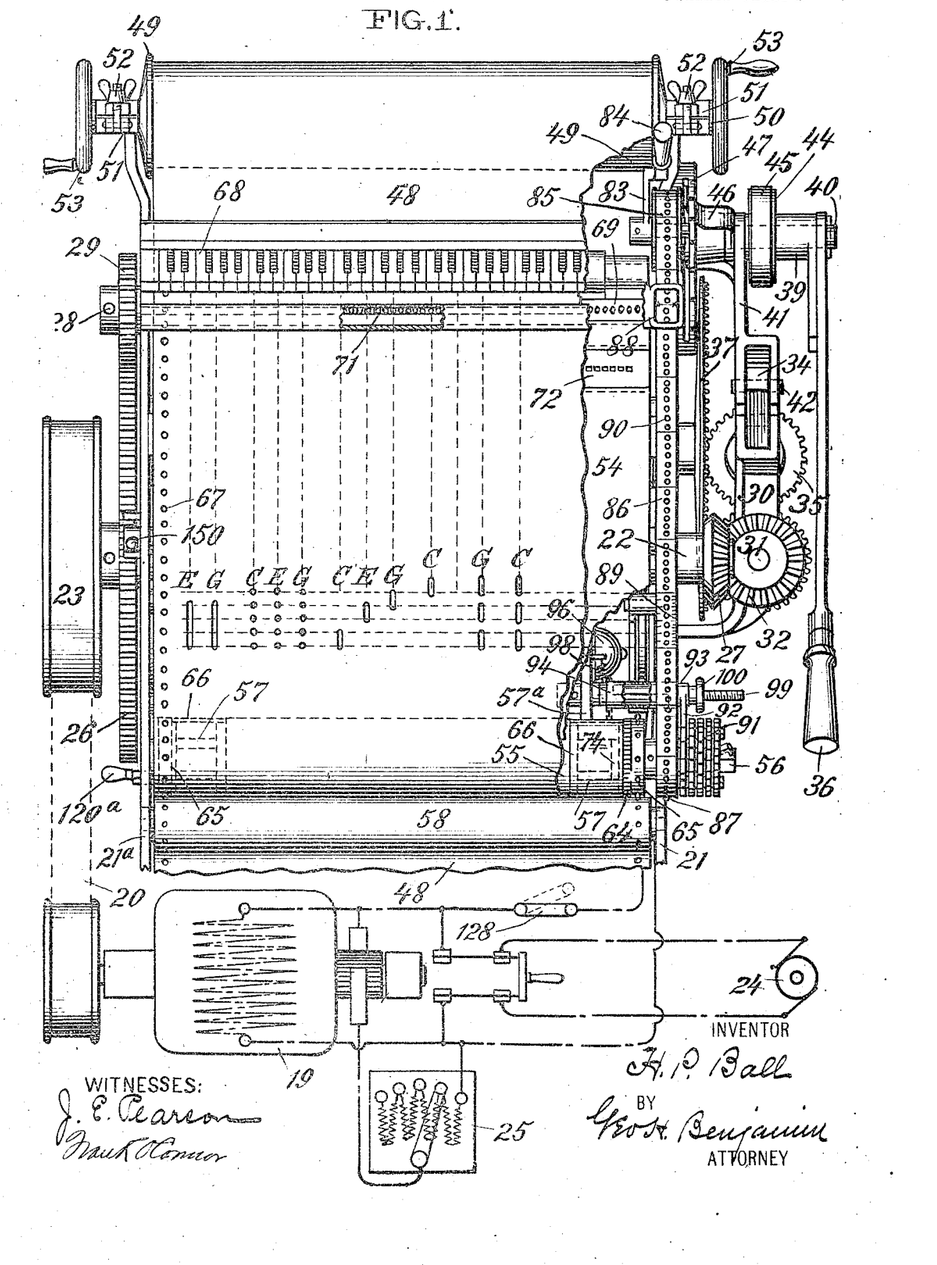
Figure 1 is a front elevation of my perforating device shown with a music-strip passing over it, the music-strip being broken away at the right-hand side, so as to more clearly illustrate the relation of the mechanism situated under the music-strip. This figure also shows in diagram the circuit connections to an electrical device for imparting movement to the perforating-machine.
Figure 2:
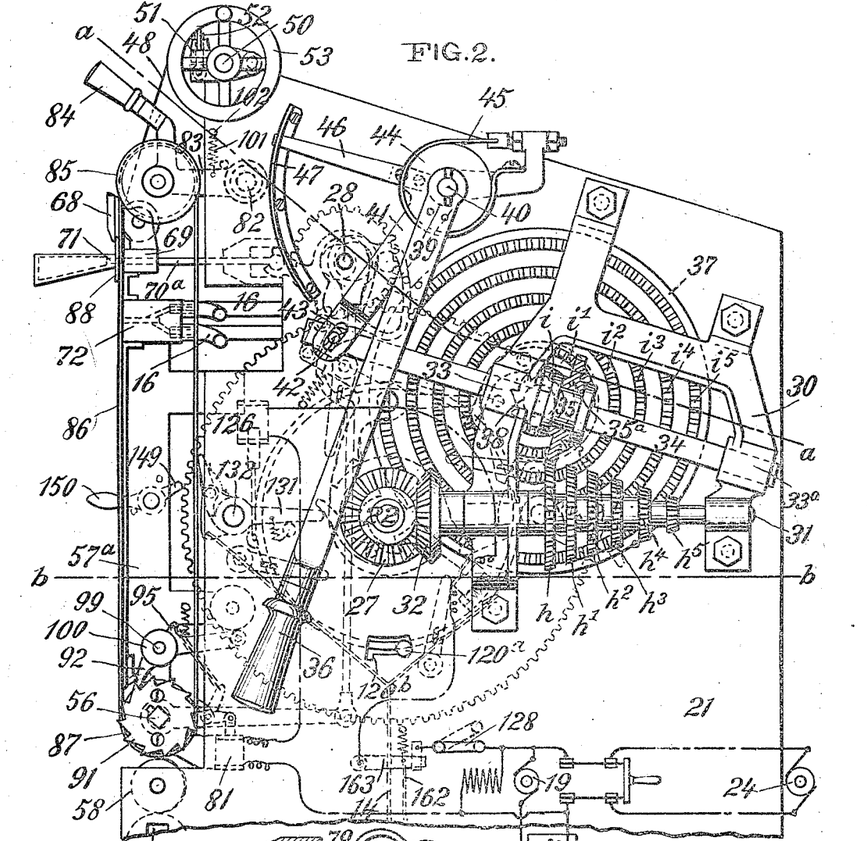
Fig. 2 is a side elevation of the perforating-machine looking from the right of Fig. 1 and also shows in diagram the circuit connections to an electrical device for imparting movement to the perforating-machine.
Figure 3:
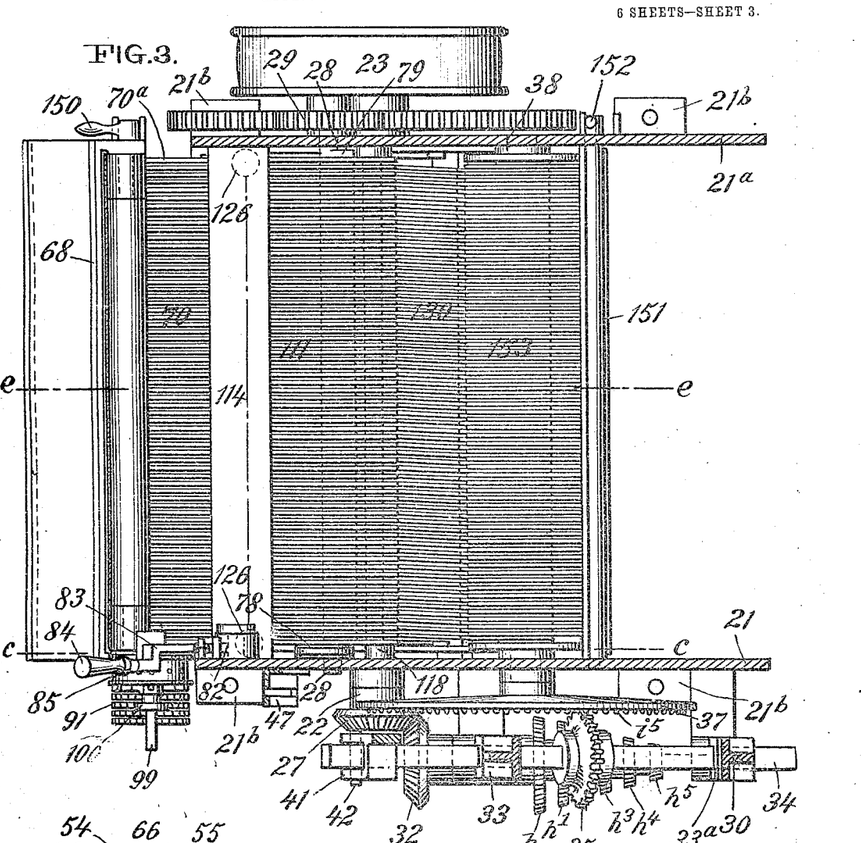
Fig. 3 is a transverse section and plan of the machine, taken on the line $a\ a$ of Fig. 2.

In order to visibly and audibly indicate the movement of the music-strip, as well as the position of the note-holes in the music-strip, and also as an indication of the measures of time, I provide, first, a visible-indicating device, which is constructed as follows: Pivotally mounted in the side frame 21 of the machine at 82, Fig. 2, is a bent arm 83, having a handle 84 at its outer end. Pivotally supported in this arm is a band-wheel 85, and over this band-wheel is arranged a perforated metal band 86. The lower end of the band 86 is carried over a sprocket-wheel 87, secured on shaft 56. The band-wheel is shown as carried through an indicator 88, (see Fig. 1,) arranged on the front of the machine at the right and in line with the tracker-board 69. The band 86 is shown as divided on its surface into a series of divisions and subdivisions of its length, as shown at 89. These divisions represent musical measures and divisions of musical measures. The band is also provided with a series of openings between each series of divisions, as illustrated at 90, and which openings or perforations are intended to coact with the projections on the rack-wheel 87. This band, it will be understood, visibly indicates measures of length and subdivisions of measures of length of musical measures. The band is removable, so that bands can be used having measures of various lengths. Secondly, to audibly indicate such divisions and subdivisions there is mounted upon the shaft 56 a series of ratchet-wheels 91. Five of such wheels are shown. These wheels are provided with a definite number of teeth to correspond with the divisions on above band—as, for instance, the first wheel to the left four teeth, the next six teeth, and so on. These teeth are separately adapted to coact with a pawl 92, Fig. 4, forming a part of a sleeve 93, which telescopes with and actuates another sleeve 94, having an arm 95, the outer end of which is located under a bell 96, Fig. 5, mounted on the right-hand side of plate 57ª. Located between the arm 95 and a pin 97, projecting from plate 57ª, is a helical spring 98, which makes upward traction upon the arm 95. Sleeves 93 and 94 are mounted upon a rod 99, secured to plate 57ª, and sleeve 93 can be adjusted to cause pawl 92 to engage any one of the ratchet-wheels 91 by means of the nut 100 on the outer screw-threaded end of rod 99.

It will now be understood that when the shaft 56 is rotated the ratchet-wheels 91 will be rotated with it, and the pawl 92 as it is moved by the sprocket-wheel over which it is located will oscillate sleeves 93 94 and cause the arm 95 to strike the bell 96 every time that a movement of the arm takes place. The bell may thus be made to sound every quarter-note, or four times per measure, every sixth, eighth, or other subdivision of a note or corresponding time per measure.

It will be understood that the divisions of the band 86 will correspond to the measure of the musical composition to be recorded upon the moving strip, and consequently that different bands, sprockets, and ratchet-wheels will be required for different compositions. The band-wheel 86, rack-wheels 87, and ratchet-wheels 91 are therefore made removable, so as to permit the substitution of the proper band, sprocket, and ratchet wheel. In order to make tension upon the band when in use, a spring 101 is introduced between the arm 83 and a pin 102, projecting from the side frame 21.

Figures 7, 12, 13:
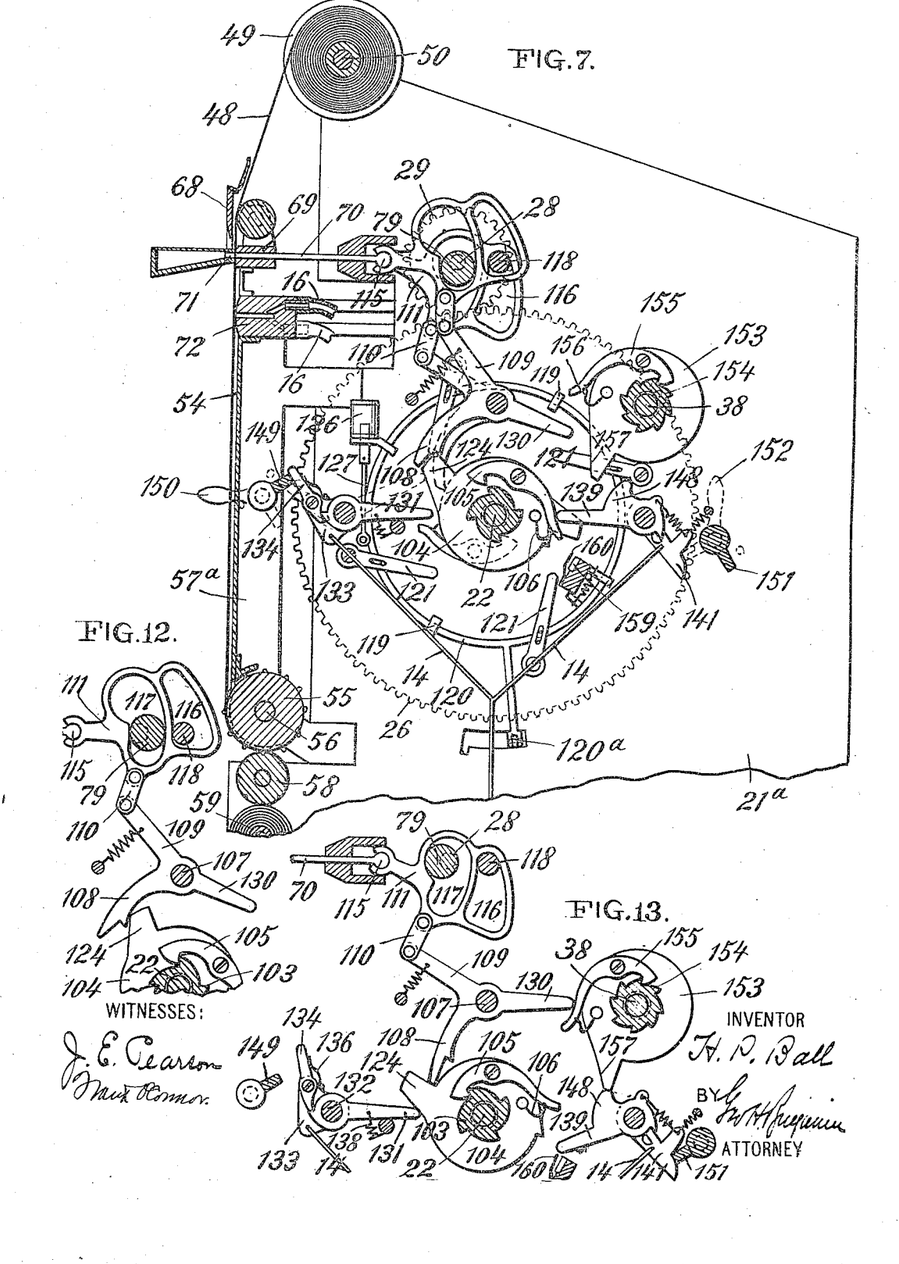
Fig. 7 is a vertical section and elevation on the line $e\ e$ of Fig. 3.
Figs. 11, 12, 13, and 14 illustrate as elevations various positions of the cams, punches, and controlling-levers forming part of the punching mechanism of my improved device.

Referring now to the mechanism for actuating and controlling the movement of the punches, two sets of punches are employed—i. e., the punches 70, which perforate the musical notes, Fig. 7, and the punches 70ª, which perforate the rack-holes, Fig. 5. Of the last-mentioned punches there are but two, one situated at each end of the series of punches. The punches 70 are under the control of the operator. The punches 70ª are automatic in their action and punch holes through the sides of the music-strip at a definite distance apart along the edges of the music-strip so long as the paper is moved. They are, however, in a sense under the control of the operator—that is, they may be stopped when the operator stops the movement of the moving music-sheet.

The mechanism for moving the rack-hole punches 70ª is shown in Fig. 5 and is as follows: Mounted on and secured to shaft 22 is a toothed wheel 103. Also loosely mounted on such shaft is a cam-disk 104. Pivoted on this cam-disk is a hook-latch 105, under the rear end of which is a spring 106, which normally tends to press the hook of the latch in engagement with one of the teeth of the toothed wheel 103. Pivoted on a rod 107, arranged transversely of the side plates 21 21ª, is a bell-crank having two arms 108 109. The arm 109 of this bell-crank is connected by a link 110 with a shaped cam-plate 111. This cam-plate has a projection 112 situated in a recess 113 in a channel-bar 114, arranged transversely of the machine. This channel-bar is perforated to receive the punches 70 (70ª,) and each punch is connected to a shaped plate 111 through a ball-and-socket joint 115. The shaped plate 111 has formed through it two openings 116 117. In the opening 116 there is located a transversely-arranged rod 118, which acts as a support for all of the shaped plates which carry the punches. In the opening 117 there is located the shaft 28, carrying the eccentrics 79. Arranged concentric with the shaft 22 and adapted to reciprocate in guides 119 (four are shown) is a ring 120. Pivotally connected to this ring are lever-arms 121, pivoted in the right-hand side plate 21. Four of such levers are shown arranged equidistant around the ring 120. Situated between a pin 122, projecting inwardly from the ring, and one of the guides 119 is a helical spring 123, which normally draws the pin 122 in contact with one surface of the guide and rotates the ring in the direction indicated by the arrow. The cam-disk 104 is provided with the two oppositely-disposed projections 124 125. The operation of this portion of my device is as follows: The shaft 22, it will be remembered, makes one revolution to four of shaft 28. When the shaft 22 is rotated in the direction of the arrow, the cam-disk 104 is rotated with it. In the rotation of the cam-disk 104 counter-clockwise the arm 108 of the bell-crank is gradually raised until it passes the projection 124 on the cam-disk 104. As the arm 108 rises the upper end of the arm 109 is moved to the right, thereby lifting the cam-shaped plate 111 into the position shown in Fig. 7, at which time a punch 70ª under the action of an eccentric 79 is moved through the music-strip. As the rotation of the cam-disk 104 continues the projection 124 of the cam-disk 104 passes from under the arm 108, thereby allowing it to drop into the position shown in Fig. 13, thereby moving the punch backward. In other words, a punch 70ª will make one complete reciprocation for each complete rotation of the cam-disk 104, and, assuming the music-strip to be moving one-twentieth of an inch for each revolution of the shaft 28, the rack-holes will be located one-fifth of an inch apart between centers.

Figure 6:
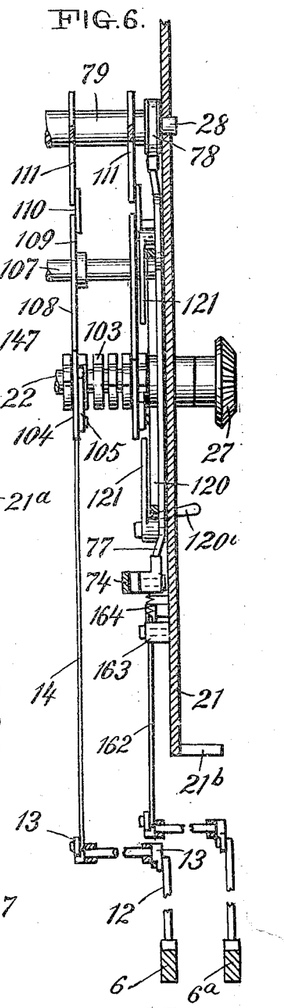
Fig. 6 is a vertical section and elevation on the line $d\ d$ of Fig. 5.

As before stated, the movement of the parts to form the rack-holes is automatic and not ordinarily under control of the operator of the machine. Should, however, it be desired to stop the punching mechanism at any moment without stopping the movement of the paper, this can be accomplished through the instrumentality of the magnet 126, which has its core connected through rod 127 with the ring 120. When the magnet 126 is excited, it makes traction upon its core and rotates the ring clockwise, the effect of which is to throw the four levers 121 into a position to engage with the rear end of the hook-latch 105, with the effect of disengaging the latch from the toothed wheel 103, stopping the rotation of the cam-disk 104, and consequently the reciprocating movement of the punches 70ª. I have shown the circuit through magnets 80 and 126 in series. They may, however, be in separate circuits. The current through the magnets 80 and 126 may be controlled through one of the keys 6 of the instrument—as, for instance, 6ª, Fig. 6— also by means of a switch 128 under the control of the operator. The detail of the circuit by switch 128 and key 6ª will be described later on.

The movement of the punches 70ª may also be controlled by means of the handle 120ª, Fig. 2, which is pivotally connected to the ring 120 and extends through the side plate of the machine. (See Fig. 7.) By moving this handle to the left the ring 120 can be correspondingly moved and can be held in place by swinging the handle 120ª down into engagement with notch 120ᵇ.

Referring now to the mechanism for controlling the punches which perforate the music-strip to make holes indicative of the the musical notes, as previously stated in the preamble, the device may be arranged to automatically reproduce the notes as struck by the performer or to automatically produce a successive series of notes of the same length—that is, the machine can be so arranged that it will respond and record every note as struck by the operator or will when the operator has struck a note repeat that note as often as desired without any further act on his part until the required number of holes have been made, and, further, will make such holes of the size and length desired by the operator, or, put in still other words, the operator may originally determine the length of the holes to be automatically repeated. The general features of construction of the mechanism employed for punching the holes representing notes is illustrated in Fig. 7. The mechanism for controlling the length of the holes when such mechanism is used is illustrated in Fig. 2. In Fig. 7 the mechanism for controlling two proximate punches is shown. I will describe the mechanism, however, as applied to but a single punch. The mechanism which serves to reciprocate the punches 70 is substantially the same as that heretofore described for the punches 70ª, and it will not be necessary to repeat it. I will therefore confine myself to a description of the mechanism for controlling the movement of the punches 70. In the description of the mechanism for controlling the punches 70ª the bell-crank lever is described as having the two arms 108 109. The bell-cranks for the punches 70 have three arms 108 109 130; and for coacting with the hook-latch 105 to control the position of such latch there is used in place of the levers 121 a pair of oppositely-disposed levers. These levers are differently constructed. That at the left, Fig. 11, consists of an arm 131, pivoted upon rod 132, arranged transversely of the machine, and a plate 133, also pivoted upon said rod. Mounted upon this plate is a pawl 134, the forward end of which is adapted to be normally engaged with a shoulder 135 on the rear of the arm 131. Situated back of the upper end of the latch is a spring 136, which presses the point of the latch into engagement with the arm 131. The arm 131 normally rests upon a transverse rod 137, arranged across the machine, and between this rod and the arm 131 is a spring 138, which normally does not make any tension upon the lever 131, but which serves to bring the lever 131 to its normal position after it has been moved upward. The lever disposed on the opposite side of the cam-disk 104 consists of the arm 139, pivoted on rod 140, arranged transversely of the machine. Pivoted also on rod 140 is a plate 141, from which projects a pin 142, which normally engages with a shoulder 143 on the rear of the lever 139. The lever 139 is connected, through a spring 144, to an arm 145, projecting upward from the shaded plate 141, and this arm is connected, through a spring 146, to a rod 147, arranged transversely of the frame. The lever 139 is also provided with a shaped shoulder 148. The plates 133 and 141 are connected, through the cords 14, lever 13, rod 12, to one of the keys 6 of the piano, as illustrated in Fig. 9. When a key is struck, traction is made upon the cord 14, the effect of which is to simultaneously draw down the plates 133 and arm 141 and to elevate the levers 131 139.

Figure 11:
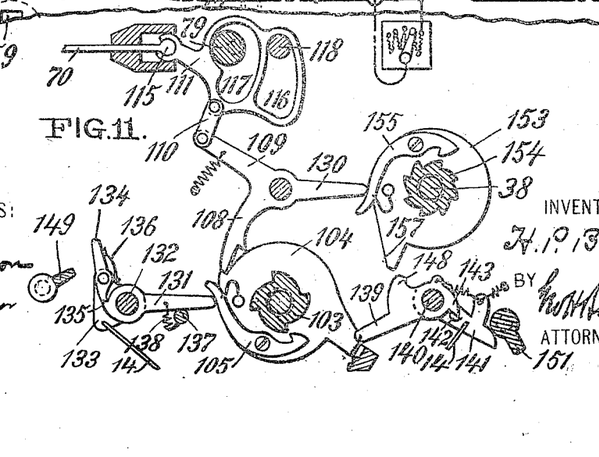
Figure 14:
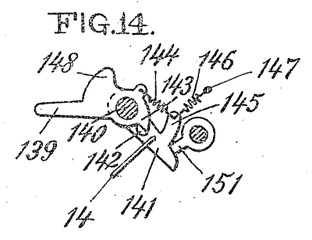

Assuming the parts to be in the position shown in Fig. 11, the movement of the arm 131 upward in passing over the tail of the latch 105 releases the latch and allows it to drop into engagement with the toothed wheel 103, which immediately starts the cam-disk 104 in rotation counter-clockwise. At the same time that the arm 131 is raised the arm 139 is raised from the position shown in Fig. 11 to the position shown in Fig. 7, in which position the arm 139 will be in the path of movement of the tail of the latch 105 and by exerting pressure upon the tail of the latch will release the latch when the cam-disk 104 has traversed one hundred and eighty degrees. At such time the parts will be in the position shown in Fig. 7, and the parts will continue in this position, the punch 70 moving in and out of the paper through the action of shaft 28 and eccentric 79 so long as the finger of the operator holds the key down. Assuming, on the other hand, that the operator has struck the key a quick blow and immediately released it, in such case the arm 139 will have fallen to its original position—i. e., that shown in Fig. 11, otherwise into a position where the end of the arm will not engage with the tail of the latch. The cam-disk therefore will continue its rotation through three hundred and sixty degrees—i. e., until the tail of the latch 105 is brought in contact with the end of the arm 131 and lifted by it from engagement with the toothed wheel 103. Bearing in mind now that the shaft 28 makes four revolutions to the shaft 22 one and that the music-strip moves forward one-twentieth of an inch for each revolution of the shaft 28, it will be observed, assuming the operator to strike the key a quick blow and not to hold it, that the perforations made in the music-strip under such conditions, assuming, further, that the perforation is one-tenth of an inch in diameter, will be one-fifth of an inch between centers, and, further, that in the case where the operator strikes the key a blow and holds the key down the punch will make one movement through the music-strip for each revolution of the shaft 28, and hence the punch will move through the music-strip four times in four-twentieths of an inch, with the result instead of a round hole an elongated hole will be made in the music-strip. The length of the hole will of course depend upon the length of time the operator depresses a key.

It will be seen from the above considerations that the length of the perforations in the strip will depend upon the control of the latch 105 exercised by the arms 131 139. This control is effected by the mechanism which I will now describe.

Situated in front of the pawl 134 on the plate 133 is a pivoted plate 149, provided with a handle 150, by which it may be rotated from the exterior of the machine. A similar plate 151 is pivoted in bearings and located back of the plate 141; and this is provided with a handle 152, by means of which it may be rotated from the exterior of the machine.

It will be seen that by rotating the plate 149 out of the path of movement of the pawl 134—i. e., in the position shown in dotted lines, Fig. 7—the arm 131 in such case will not be released when traction is made upon the cord 14, but will remain out of the path of movement of the tail of the latch 105, and as a consequence the latch 105 will remain in engagement with the toothed wheel 103 and the cam-disk 104 will continue in rotation, the punch making one movement through the music-strip for each rotation of the cam-disk 104. It will further be observed that when the plate 151 is rotated into the position indicated in the dotted lines in Fig. 7 the cord 14 no longer has any influence over the arm 139 and this arm will remain in its upper position—i. e., in the position to engage with the latch 105. Consequently, assuming these two levers to be influenced by the plates 149 and 151, as stated, they will take the arm 131 the position shown in the dotted line and the arm 139 the position shown in the full lines, Fig. 7, with the result that the cam-disk will make one-half of a revolution, when the tail of the latch 105 will engage with the arm 139 and the punch will be moved forward and backward continuously through the moving music-strip so long as this condition prevails.

As it is not desired to form a continuous perforation through the music-strip, but perforations of different lengths, means is provided for depressing the arm 139 at definite intervals of time, and in this means is found the automatic means for regulating the length of the slots, which I will now describe. Mounted upon the shaft 38 is a cam-disk 153 and also a toothed wheel 154. This wheel is provided with eight teeth. It may have any number of teeth desired. Pivoted upon the cam-disk 153 is a hook 155, under the tail of which is a spring 156, which normally presses the end of the hook into engagement with the toothed wheel 154. The cam-disk 153 corresponds in shape to the cam-disk 104 in that it has a projection or cam-face 157. It will be observed that the arm 130 of the bell-crank is in the path of movement of the tail of the latch 155 on the cam-disk 153. In Fig. 11 the arm 130 is shown as lying over the tail of the latch and the latch out of engagement with the toothed wheel. In Fig. 7 the latch is shown as in engagement with the toothed wheel. Remembering now that the speed of rotation of the cam-disk 153 is dependent upon the position of the gear 35 relative to the gears h i, it will be seen that by the rotation of the cam-disk 153 clockwise the arm 139 will be depressed every time the projection 157 of the cam-disk 153 is brought over the shoulder 148 on the arm 139 and that consequently the length of time the cam-disk 104 will remain at rest with the tail of the latch 105 in contact with the arm 139 will depend upon the rapidity of motion of the cam-disk 153 and that as the number of reciprocations of the punch 70 is dependent upon the length of time the cam-disk 104 is at rest the length of perforation made in the paper will depend upon the rapidity of the movement of cam-disk 153, which, as previously stated, can be altered in speed by the movement of the handle 36.

It will be observed from the description as given that a time interval is interposed between the striking of a key and the action of a punch and irrespective of whether the punch makes a single round hole or a number of coalescing holes to form a slot or a number of successive holes of the same size.

In order to control the action of the machine as a whole or, in other words, to stop the movement of the music-strip, as also the action of the punches at any moment, when the punches are in operation, I provide the electrical device which I will now describe.

Arranged transversely of the machine on a bar 158 are a series of plates 159, the first and last of which are connected to a source of electricity. Mounted on the bar 158 are the spring-plates 160, so located as to bridge two of the plates 159 when the projection 124 of two of the cam-disks 104 registers in position with the plates.

From the above it will be seen that when all of the cam-plates 104 coincide in position all of the plates 159 will be in series and a circuit established between the terminals connected with the source of electricity. Also included in the same circuit are the solenoids 126 and 81. Consequently when a current is sent through the circuit it will energize solenoid 126 to attract its core 127 to rotate the ring 120, and thereby bring the arms 121 into position to stop the movement of the cam-disk 104. The solenoid 81 is also excited, which attracts its core and releases the pawl 76 and also rotates backward a lever 161, connected, through a chain, to arm 95, which rotates sleeves 94 and 93, raising pawl 92 on sleeve 93 away from ratchet-wheels 91, thus releasing cylinder 55, thereby permitting the paper 48 to be moved upward, if desired.

It will be observed that the circuit described cannot be made until all of the cam-disks 104 have their contact-springs 160 lapping contact-plates 159. The object of this arrangement is to insure the circuit not being completed until all punching movements have been fully completed.

From the above description it will be seen that whenever a projection 124 of a cam-disk 104 is in its travel away from spring-plates 160 there is no circuit through magnet 81. Consequently the pawl 76 continues to rotate cylinder 55 and feed the paper 48. If no keys 6 are pressed and in consequence no disk 104 rotating, they all come to a standstill with the projections 124 against the spring-plates 160, which closes the circuit through magnet 81, releasing cylinder 55 and allowing the paper 48 to be moved, the mechanism which operates the rack-hole punches 70ª being stopped at the same time by the circuit passing through magnets 126.

If the operator stops playing keys 6, the paper stops feeding. It is therefore necessary to provide some means for feeding the paper at such times in order that a rest can be introduced in the music-sheet. It is for this purpose that the key 6ᵃ is used to break the circuit by means of the rod 162, connected to switch 163, which is held closed by spring 164.

Switch 128 is to be used for breaking the circuit, and so causing the paper to be fed without the necessity of pressing the key 6ᵃ.

In the foregoing description I have endeavored to describe the mechanism by which the individual movements of an operator upon a piano or similar instrument will be automatically followed by the perforating-machine and also mechanism by reason of which a series of successive holes of any previously-defined length may be automatically formed through a moving music-strip, each of said mechanisms embodying the feature of a time limit between the act of the operator and the resultant action of the machine. Various controlling and indicating means have also been described. I wish it understood that I do not limit myself to the precise mechanism illustrated and described for accomplishing the results specified, as it will be evident that many changes may be made in the parts and the relation of parts without in any wise departing from the intent of my invention.

Having thus described my invention, I claim—

1. A machine of the class described comprising a keyboard, a recording mechanism for the notes struck on the keyboard, and automatic means for successively repeating the record of one or more of the notes struck.

2. A machine of the class described comprising a keyboard, a recording mechanism for the notes struck on the keyboard, means for initially determining the time value of the record of the notes struck, and automatic means for successively repeating the record of such notes.

3. A machine of the class described comprising a keyboard, a recording mechanism for the notes struck on the keyboard, means for initially determining the length of the record indicative of one or more of the notes struck, and means for automatically multiplying and spacing the record of such notes.

4. A machine of the class described comprising a keyboard, a recording mechanism for the notes struck on the keyboard, means for initially fixing at the will of the performer the character of the record which shall be made and indicative of the action of one or more of such keys and also the time that such key or keys are held by the performer, and means for automatically repeating such record at intervals.

5. A machine of the class described comprising means for audibly and visibly indicating measures of musical length, a tracker-board, and a guide arranged in line with said tracker-board through which said indicator of musical measure passes.

6. A machine of the class described comprising a keyboard, a recording mechanism for the notes struck on the keyboard, means for indicating the nomenclature of the record indicative of the action of each key, and means moving with the record and structurally independent thereof for indicating the measures of musical length made by such record.

7. A machine of the class described comprising a keyboard, a recording mechanism for the notes struck on the keyboard, means for initially adjusting the mechanism to give the same time value to all records of notes struck, and means for visibly indicating the character of the record to be produced.

8. A machine of the class described comprising a keyboard, a recording mechanism for the notes of the musical composition, means for initially regulating the length of the record indicative of one or more of said notes, and means for visibly indicating the length of the record to be produced.

9. A machine of the class described comprising means for giving the paper a forward movement, means for forming rack-holes in the paper, means for perforating the paper to indicate musical notes, and means for stopping the movement of the note-perforating mechanism, whereby the music-strip may be moved forward without having note-perforations formed therein.

10. A machine of the class described comprising a keyboard, means for automatically repeating upon a moving strip the record of a note or notes struck on the keyboard, means for forming holes in said strip indicative of the notes struck and repeated, and means for controlling the repeating mechanism.

11. A machine of the class described comprising a keyboard, means for automatically repeating upon a moving strip the record of a note or notes struck on the keyboard, means for forming holes in said strip indicative of the notes struck and repeated, means for controlling the movements of said strip, and means for controlling the repeating mechanism.

12. A machine of the class described comprising a keyboard, means for automatically repeating upon a moving strip the record of a note or notes struck on the keyboard, means for forming holes in such strip indicative of the notes struck and repeated, means for controlling the speed of operation of the repeating mechanism.

13. A machine of the class described comprising a keyboard, a series of punches operating upon a moving music-strip, means introduced between the keys and punches for controlling the initial movement of said punches, and automatic means for controlling the subsequent movement of said punch or punches to produce a spaced record indicative of a trill or run.

14. A machine of the class described comprising a keyboard, a series of punches operating upon a moving music-strip, means introduced between the keys and the punches for controlling the initial movement of said punches, and mechanically-operated means for controlling the time interval between successive operations of a selected punch to produce a record indicative of a trill or run.

15. A machine of the class described comprising a keyboard, a series of punches operating upon a moving music-strip, means introduced between the keys and punches for controlling the initial movement of said punches, automatic means for controlling the time interval between successive operations of a selected punch to produce a record indicative of a trill or run, and means for stopping the movement of said punch without stopping the movement of the music-strip.

16. A machine of the class described comprising a keyboard, a series of punches operating upon a moving music-strip, and means for adjusting the machine to automatically produce a given number of individual perforations per unit of length of the music-strip.

17. A machine of the class described comprising means for striking the notes to be recorded, means for recording, means for sounding the notes recorded, and means for initially regulating the length of the note on the record.

18. A mechanism of the class described comprising means for striking the notes to be recorded, means for recording the notes, means for sounding the notes recorded, and means for automatically recording successive notes of the same name and duration.

19. A machine of the class described comprising a keyboard, means for recording the notes struck on the keyboard, means for initially regulating the length of the perforation indicative of a note made in the record, and means for indicating measures of musical length in the travel of the record.

20. A mechanism of the class described comprising means for striking the notes to be recorded, means for recording the notes, means for initially regulating the length of the note on the record, and means for visibly indicating the name of the notes recorded.

21. A machine of the class described comprising a keyboard, means for recording the notes struck on a moving strip, and regulatable means for fixing the length of the perforations indicative of certain notes recorded.

22. A machine of the class described comprising a keyboard, means for recording on a moving strip the notes struck on the keyboard, and an adjustable metronome adapted to indicate measures of musical length in the travel of the music-strip.

23. A machine of the class described comprising a keyboard, means for recording on a moving strip the notes struck, means for initially regulating the length of the record of the notes struck, and means for visibly indicating the length of the perforation which the machine is adjusted to record.

24. A machine of the class described comprising a keyboard, means for moving a music-strip at a determinate speed, a recording-device for the notes struck on the keyboard, and means for initially determining the length of the record made indicative of the notes struck.

25. A machine of the class described comprising means for striking the notes, means for recording the notes, means for initially regulating the length of the note on the record and automatic means for recording said note with such predetermined length.

26. A machine of the class described comprising means for striking the notes, means for recording the notes, means for initially regulating the length of the note on the record and changeable means for indicating when to strike the notes, and automatic means for recording the notes with the initially-determined length.

27. A machine of the class described comprising means for striking the notes, means for recording the notes, and means for producing similar successive records with one movement of the key.

28. A machine of the class described comprising means for striking the notes, means for recording the notes, means for initially regulating the length of the note on the record and means for automatically producing similar successive records with one movement of the key.

29. A machine of the class described comprising means for striking the notes, means for recording the notes, automatic means for recording the notes with initially-determined length, and means for automatically producing similar successive records with one movement of the key.

30. A machine of the class described comprising means for striking the notes, means for recording the notes, means for initially determining the length of the note on the record and means for automatically producing similar successive records with one movement of the key.

31. A machine of the class described comprising a keyboard, and means for automatically recording on a music-strip as a series of perforations, musical trills or runs.

32. A machine of the class described comprising means for striking the notes, means for recording the notes, automatic means for recording notes with initially-determined length and means for producing similar successive records with one movement of the operator.

33. A machine of the class described comprising means for striking the notes, means for recording the notes, and means for automatically producing similar successive records at definite intervals.

34. A machine of the class described comprising means for initially regulating the length of the record which shall be indicative of a note, means for striking such note and causing a record thereof, and means for automatically reproducing such record at definite intervals in the travel of a music-sheet.

35. A machine of the class described embodying automatic means for repeating in the same sheet the record made by any selected note.

36. A machine of the class described comprising means for striking the notes, means for recording the notes, means for visibly indicating measure of musical length, and means for adjusting the machine to perform a given number of punching operations per such measure.

37. A machine of the class described comprising means for striking the notes, means for recording the notes, changeable means for indicating the length of paper per measure, and means for producing a given number of punch operations per said measure.

38. A machine of the class described comprising a keyboard, a perforating mechanism, and means for indicating the length of perforations the machine is adjusted to produce.

39. A machine of the class described comprising a keyboard, a perforating mechanism, and means for automatically controlling the length of slots made by the perforating mechanism.

40. A machine of the class described comprising a keyboard, a perforating mechanism, means for automatically controlling the length of perforations made, and means for throwing said last-named means into and out of action.

41. A machine of the class described comprising a keyboard, means for recording the notes struck, means for automatically recording as trills certain notes not struck, and means for sounding any of the notes recorded after recording.

42. A machine of the class described comprising a keyboard, a perforating mechanism, means for automatically controlling the length of perforations made thereby, and means for automatically perforating similar holes equally spaced one from the other.

43. A machine of the class described comprising a keyboard, a perforating mechanism, means for automatically controlling the length of perforations made thereby, and means for advancing the paper a given amount between successive perforations.

44. A machine of the class described comprising a keyboard, a perforating mechanism, means for automatically controlling the length of the perforations made thereby, and means for advancing the paper a given amount per measure of musical length.

45. A machine of the class described comprising a keyboard, a series of perforating mechanisms and means for controlling automatically the length of perforations made.

46. A machine of the class described comprising a keyboard, a series of perforating mechanisms, a series of controllers for the mechanisms for automatically governing the time they are in action and means for automatically controlling the length of perforations made by the perforating mechanisms.

47. A machine of the class described comprising a keyboard, a series of perforating mechanisms, a series of controllers for automatically governing the time the perforating mechanisms are in action, means for adjusting the speed of said controllers to various desired amounts so that the machine automatically controls the length of perforations made.

48. A machine of the class described embodying a recording device provided with means for automatically and successively repeating the record of any note recorded.

49. A machine of the class described embodying a recording device provided with means for initially determining the length of the record indicative of a note and for automatically reproducing said record.

50. A machine of the class described comprising a keyboard, a series of perforating mechanisms, means for automatically controlling the length of perforations made, a metronome device audibly indicating periods of time corresponding to variable predetermined numbers of perforating operations.

51. A machine of the class described comprising means for striking the notes to be recorded, means for recording the notes, means for sounding the notes recorded, and a metronome device for audibly indicating the subdivisions of musical time of the recorded notes.

52. A machine of the class described comprising means for striking the notes to be recorded, means for recording the notes, means for sounding the notes recorded, and a detachable metronome device which beats corresponding to the time of the notes recorded.

53. A machine of the class described comprising means for striking the notes to be recorded, means for recording the notes, and an indicating device marked to represent the keys of the pinao giving thereby the name of the note represented by the perforations.

54. A machine of the class described embodying recording means provided with a fixed transversely-arranged scale indicative of the name of the notes recorded, and a scale indicative of measures of musical length and traveling at a fixed relative speed to that of the musical strip but independent thereof.

55. A machine of the class described comprising a perforating mechanism, means for automatically controlling the lengths of perforations made thereby, and means for indicating the lengths of the perforations for which the machine is set.

56. A machine of the class described comprising a keyboard, a perforating mechanism to produce a given length of slot and means for indicating the length of slot the machine is set to perforate.

57. A machine of the class described comprising means for striking the notes to be recorded, means for recording the notes and means for automatically controlling the length of the individual records of each note irrespective of the length of time they are sustained on the key by the performer.

58. A machine of the class described comprising means for striking the notes to be recorded, means for recording the notes, means for initially determining the length of the note on the record and means for automatically adjusting the machine to produce records of said length.

59. In a machine such as described a traveling sheet of paper, and an index subdivided into measures of musical length traveling with the paper, said index being changeable for definite measures of musical length.

60. In a machine such as described a traveling index divided to visibly indicate divisions of musical time, and a metronome device similarly divided to indicate said divisions, and means for changing said index and said metronome being detachable from the machine so that they can be replaced with others intended for different measures of musical time.

61. A machine of the class described comprising a keyboard, a perforating mechanism, and an indicator marked in black and white to represent the keys of a piano whereby the perforations produced by the perforating mechanism are associated with their respective notes.

In testimony whereof I affix my signature in the presence of two witnesses.

HENRY PRICE BALL.

Witnesses:
J. E. PEARSON,
FRANK O'CONNOR.